United States Patent [19]

Bunger

[11] 4,433,831
[45] Feb. 28, 1984

[54] FENCE TENSIONING DEVICE

[76] Inventor: Richard E. Bunger, 5202 E. Washington St., Phoenix, Ariz. 85034

[21] Appl. No.: 389,667

[22] Filed: Jun. 18, 1982

[51] Int. Cl.³ .............................................. B21F 27/00
[52] U.S. Cl. ......................................... 256/39; 267/70
[58] Field of Search ............... 256/39, 37, 38; 267/70, 267/71, 72

[56] References Cited

U.S. PATENT DOCUMENTS

| | | | |
|---|---|---|---|
| 362,911 | 5/1887 | Vanover | 256/39 |
| 448,030 | 3/1891 | Harnish | 267/70 |
| 533,334 | 1/1895 | Yankley | 256/39 |
| 3,367,634 | 2/1968 | Nielsen et al. | 256/38 |

*Primary Examiner*—Andrew Kundrat
*Attorney, Agent, or Firm*—Warren F. B. Lindsley

[57] ABSTRACT

A tensioning and anchoring device for fence cables including spaced upstanding posts anchored in the ground and having cables arranged therebetween including a stress distributing assembly employing a plurality of coil tension springs, one mounted around the free ends of each of the cables. The springs are positioned in a bracket between a fixed side thereof and a movable bar to which the free ends of the cables are attached, which bar applies a resultant substantially equal force to all of the cables.

4 Claims, 6 Drawing Figures

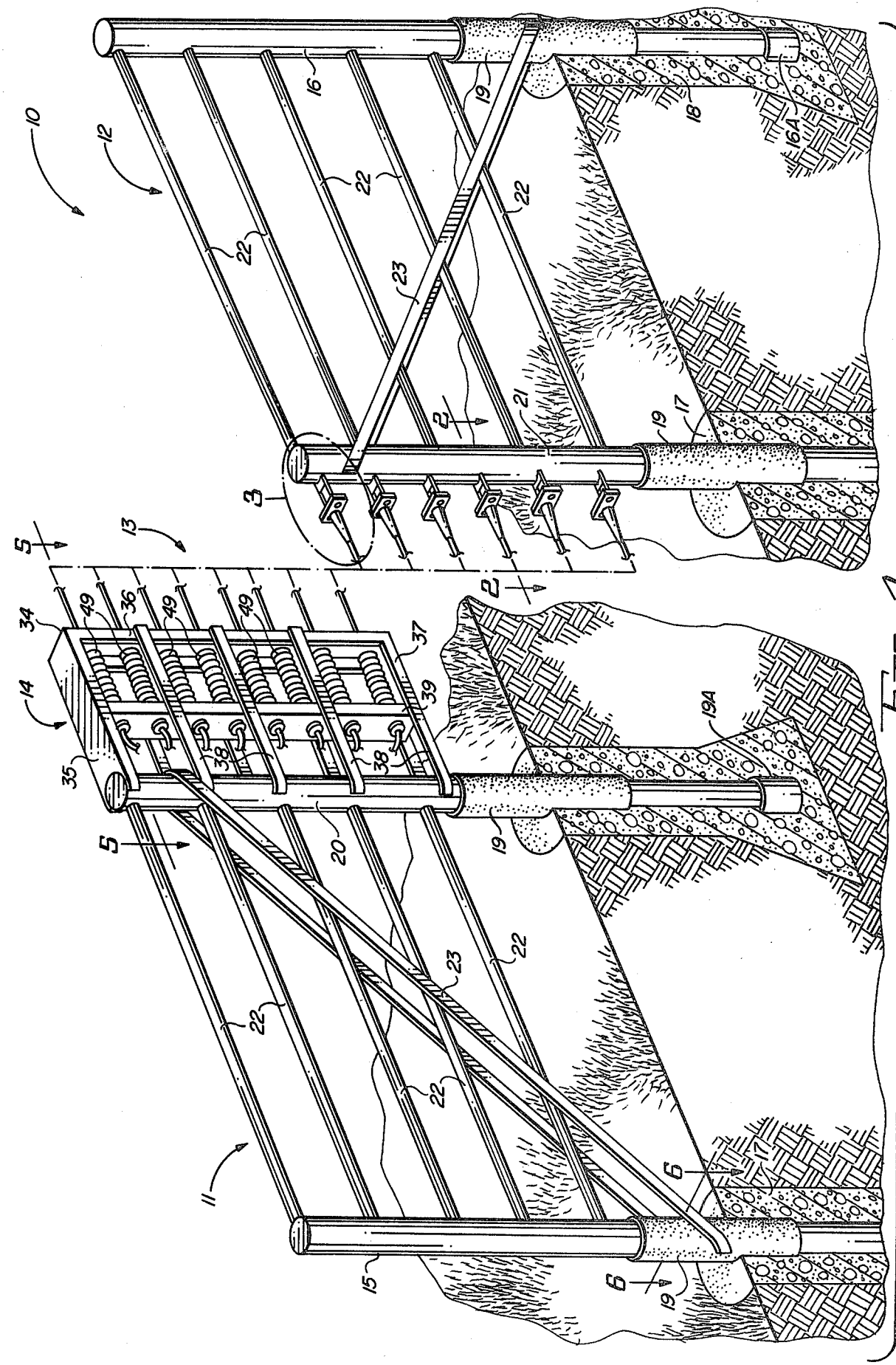

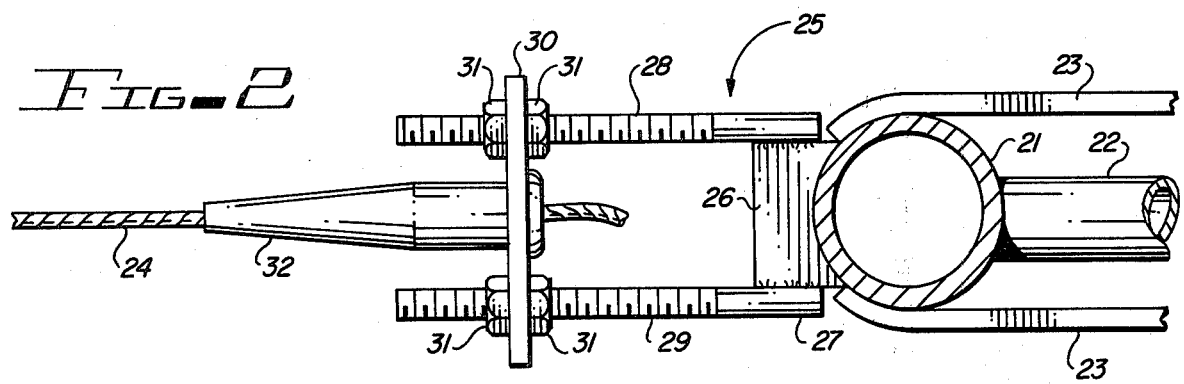
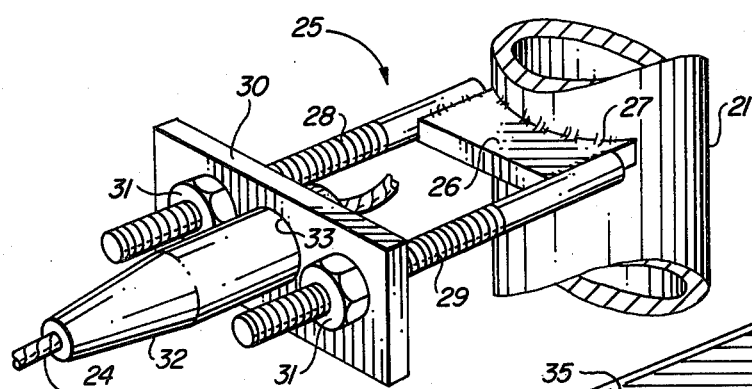
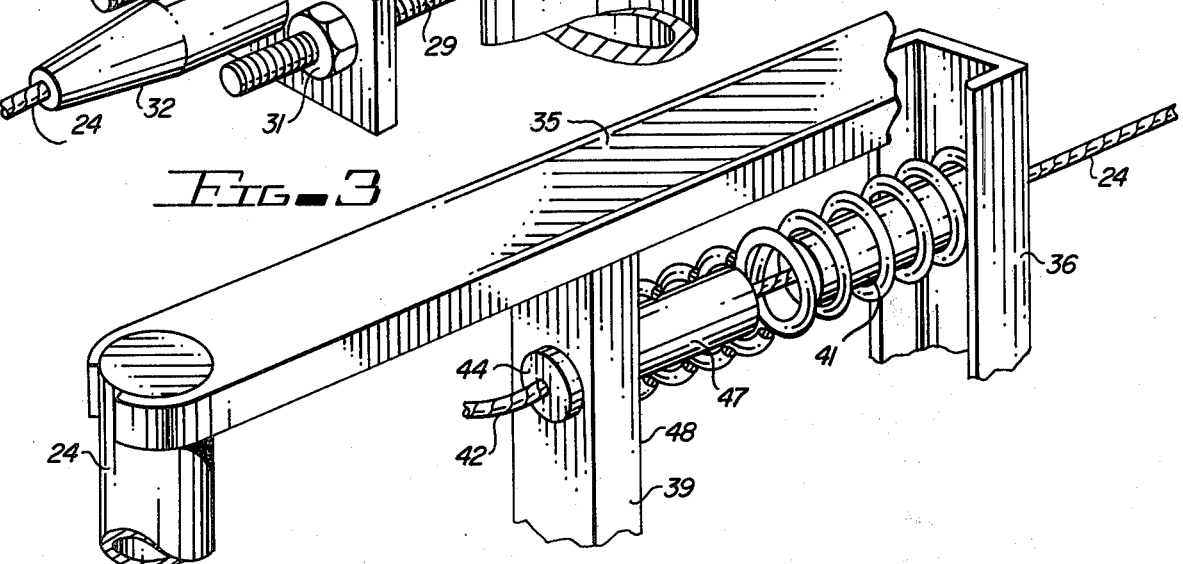
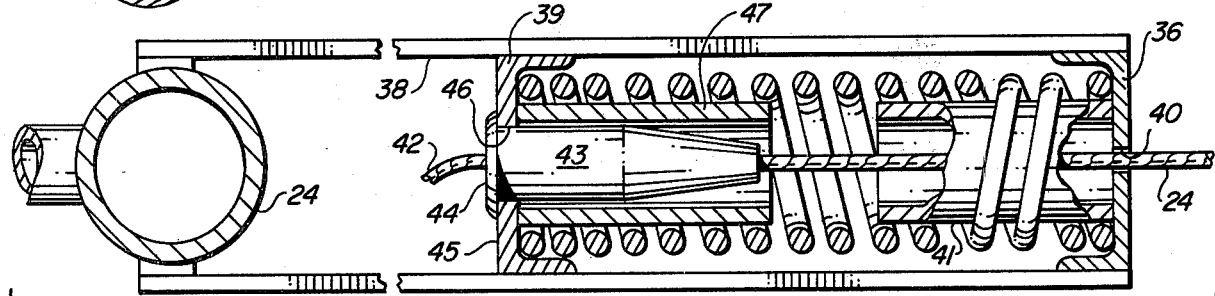
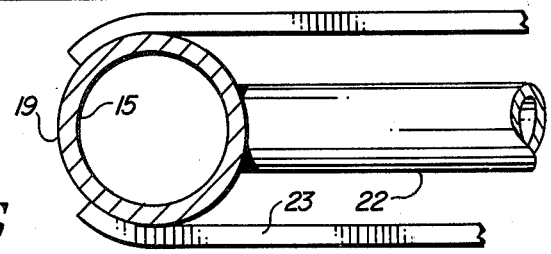

FENCE TENSIONING DEVICE

BACKGROUND OF THE INVENTION

This invention relates to tensioning and anchoring devices for fence cables, and more particularly, to a stress distribution assembly for uniformly applying tension to cables or other types of fence materials.

The novel features disclosed are particularly important in cattle fencing where crowding in close quarters occurs and a minimum breaking point of the cables must be between six and ten thousand pounds.

Barbed wire is not desirable for this type of fencing because of the possibility of injury to the cattle. Furthermore, the barbed wire does not have the strength needed for this purpose. Rail type fencing employing pipe or steel bars has been used in lieu of cable for cattle fencing; however, no practical and expedient way exists for maintaining a tight fence due to the forces of expansion and contraction acting on the fence.

It has been proposed to retain cable or wire fences in tension by means of springs; however, prior use of springs has been adversely affected by exposure to the elements and has been prohibitive in cost.

DESCRIPTION OF THE PRIOR ART

U.S. Pat. No. 3,367,634 discloses a fence tensioning device employing an upstanding support anchored in the ground. A stress distributing assembly is set forth employing, among other things, a weighted block for maintaining tension in the fence cables regardless of expansion or contraction due to temperature variations.

Although this structure may function effectively, it is too bulky, complicated and difficult and heavy to assemble. A new and effective spring cable tensioning means is needed for the cattle industry.

SUMMARY OF THE INVENTION

In accordance with the invention claimed, a new and improved spring tensioning means for cable fences is provided which maintains uniform and constant tension on a plurality of fence cables by attaching each of the cables to its own independent tension spring in a novel manner.

It is, therefore, one object of this invention to provide a new and improved tensioning means for cable type fences.

Another object of this invention is to provide a new and improved tensioning means for cable type fences, which means applies substantially equal tension to each cable of the fence regardless of the ambient temperature or other extrinsic factors which adversely affect the tension of a cable.

A further object of the invention is to provide a fence tensioning device employing novel means for distributing the forces imparted to the fence when the fence cables are stressed.

Further objects and advantages of the invention will become apparent as the following description proceeds; and the features of novelty which characterize the invention will be pointed out with particularity in the claims annexed to and forming a part of this specification.

BRIEF DESCRIPTION OF THE DRAWINGS

The present invention may be more readily described with reference to the accompanying drawings, in which:

FIG. 1 is a perspective view of the fence tensioning and anchoring device comprising the present invention;

FIG. 2 is a cross-sectional view of FIG. 1 taken along the line 2—2;

FIG. 3 is an enlarged view of the circled area labeled 3 of FIG. 1;

FIG. 4 is a partial perspective view of the top tensioning means shown in FIG. 1;

FIG. 5 is a cross-sectional view of FIG. 1 taken along the line 5—5; and

FIG. 6 is a cross-sectional view of FIG. 1 taken along the line 6—6.

DESCRIPTION OF THE PREFERRED EMBODIMENT

Referring more particularly to the drawings by characters of reference, FIG. 1 discloses a fence tensioning and anchoring device 10 comprising a pair of support sections 11 and 12, a stress distributing section 13 attached to the support sections and a tension compensating device 14 forming a part of the stress distribution section 13.

The support sections 11 and 12 comprise upright post members 15 and 16, respectively, a portion of each extending below the ground surface when the fence is erected and held therein by concrete footings 17 and 18. A collar or sleeve of plastic or coating of urethane or other suitable rust preventive material 19 may be applied around each of the posts to extend above and below ground level, as shown. The base of each post may be provided with deformable collars 16A and 19A and anchored in a bell shaped concrete block, as shown in FIG. 1.

Each of posts 15 and 16 are joined together with posts 20 and 21, respectively, to form sections 11 and 12, which posts are similar to posts 15 and 16 and spaced therefrom and anchored in the ground in the same manner as posts 15 and 16. Similar reference numerals are used for like component parts.

The posts of support sections 11 and 12 are rigidly held in spaced apart position, each by a plurality of spaced apart, relatively parallel rails 22 which may be formed from steel piping or the like. Each support section may be further supported by a diagonally arranged, loop shaped, metallic strap or strut 23 which is anchored to each of the associated posts at opposite ends thereof to provide increased structural rigidity to the support sections. Each strap or strut transfers forces applied to the upper ends of posts 20 and 21 directly to the foot end of the anchoring posts 15 and 16 associated therewith.

The stress distributing section 13 comprises a plurality of substantially parallelly arranged, horizontally positioned cables 24 which are each anchored at one end to post 21 to lie in the same plane in the manner shown in FIGS. 1, 2 and 3.

An anchoring device 25, one for each end of cables 24, comprises a flange 26 welded along an arcuate edge 27 to post 21 and arranged to extend laterally from post 21 in a direction substantially parallel with the longitudinal axis of cables 24.

A pair of threaded bolts 28 and 29 are each secured at a common end to flange 26 and arranged to extend laterally therefrom in a spaced arrangement, one on each side of an associated cable and parallel therewith. An apertured bracket 30 is mounted on bolts 28 and 29 and bridges the gap between the bolts in the manner shown and is secured thereto at a selected point by a pair of nuts 31, one arranged on each of the bolts on each side of the bracket.

Each of the common ends of cables 24 is securely attached to bracket 30 by a conically shaped split cone or cartridge 32, known in the art, through which the free end of the cable is extended. When the nose end of the cartridge is extended through an aperture 33 in bracket 30 and bracket 30 slidably moved along bolts 28 and 29 under tension toward posts 21, the walls of the aperture extending through cartridge 32 will tightly grip cable 24 in the known manner to hold the cable taut.

The other ends of each of cables 24 are mounted in the tensioning compensation device 14, which device comprises a rectangular frame 34 having a top 35, side 36 and bottom 37. Spacedly positioned in a parallel horizontal arrangement are shown a plurality of struts or straps 38 which form together with the post 20 a bracket within which a spring biased, equalizing, movable bar 39 is arranged to function to hold cables 24 taut.

As more clearly shown in FIGS. 4 and 5, each cable extends through an aperture 40 in side 36 of frame 34 and longitudinally through an open-ended cylinder or collar 41 which is secured to extend laterally therefrom within frame 24. The end 42 of cable 24 extends through the tip of a conical cartridge 43 and out of its collar 44 which is positioned on the outside surface 45 of a bar 39. The conical configuration of the cartridge extends through an aperture 46 in bar 39, as shown in FIG. 5, with cartridge 43 gripping cable 24 extending therethrough in the known manner.

As shown in FIGS. 4 and 5, a further open-ended cylinder or collar 47 is mounted around each of the cartridges 43 and fixedly secured at one end to the inside surface 48 of bar 39 in axial alignment with collars 44 attached to side 45 of bar 39.

A tension coil spring 49 is mounted around the outer periphery of collars 41 and 47, being seated against side 36 and against the inside surface 48 of bar 39, thus biasing bar 39 to a given position along the length of top 35 and bottom 37 of frame 34 depending on the condition of cables 24.

In view of the fact that bar 39 is under the effect of all of the coil springs 49 and all of the springs are of substantially the same strength, the stress forces on cables 24 should be substantially equal and constant. Further, if an animal, in an attempt to force itself through the fence composed of cables 24, should concentrate its weight against either a single cable or several of the cables, bar 39 will maintain the tension equally on all the cables. Still further, if any one of the cables should break or elongate due to severe loading, the balance of the fence would not be affected.

It should be noted that by mounting the coil springs in frame 34 in the manner shown, the coils are protected from tampering and provide safety to the animals during use. Further, the springs are axially aligned with the cables and the longitudinal axis of the fence for elimination of unwanted torque between the cooperating parts and to provide a center line tensioning device.

It should further be noted that cylinders 41 and 47 are of such a length that they prevent "bottoming out" of the springs, i.e. compressing beyond a given amount.

Still further, the tension on each spring may be individually adjusted by the bolt and nut configurations 28, 29 and 31.

While the apparatus herein disclosed and described constitutes a preferred form of the invention, it is also to be understood that the apparatus is capable of mechanical alterations without departing from the spirit of the invention, and that such mechanical arrangement and commercial adaptations as fall within the scope of the appendant claims are intended to be included herein.

What is claimed is:

1. A fence tensioning and anchoring device for flexible fencing members comprising in combination:

a first upstanding support, means for anchoring said first support to the ground, a stress distributing assembly mounted on said first support, said assembly comprising a tension compensating device, said device comprising a bracket having a top, one side and a bottom, a bar mounted within said bracket for movement in said bracket longitudinally of said top and bottom and said fencing members, a plurality of flexible cable members, one end of each of said cable members extending through said side of said bracket and being anchored to said bar in a spaced arrangement, coil spring means mounted within said bracket, one mounted around each of said cable members for extending between said side of said bracket and said bar axel applying a tension force between said side and a point on said bar adjacent the point of anchoring of the associated cable member to said bar, whereby a resultant like amount of tension is applied to each of said cable members, a second upstanding support spaced from said first support, means for anchoring the other end of each of said cable members to said second support so that said cable members extending between said first and second supports lie under tension in a substantially centerline tensioning arrangement, a third upstanding support spacedly positioned from said first support, substantially rigid rail means spacedly mounted in a parallel plane between said first and third supports, and strut means extending between the top of said first support and the anchored end of said third support for anchoring one end of said fence.

2. The fence tensioning and anchoring device set forth in claim 1 in further combination with:

a fourth upstanding support spacedly positioned from said second support, substantially rigid rail means spacedly mounted in a parallel plane between said second and fourth supports, and strut means extending between the top of said second support and the anchored end of said fourth support for anchoring the other end of said fence.

3. A fence tensioning and anchoring device for flexible fencing members comprising in combination:

a first upstanding support, means for anchoring said first support to the ground, a stress distributing assembly mounted on said first support, said assembly comprising a tension compensating device, said device comprising a bracket having a top, one side and a bottom, a bar mounted within said bracket for movement in said bracket longitudinally of said top and bottom and said fencing members, a plurality of flexible cable members, one end of each of said cable members extending through said side of said bracket and being anchored to said bar in a spaced arrangement, coil spring means mounted within said bracket, one mounted around each of said cable members for extending between said side of said bracket and said bar and applying a tension force between said side and a point on said bar adjacent the point of anchoring of the associated cable member to said bar, whereby a resultant like amount of tension is applied to each of said cable members, a second upstanding support spaced from said first support, means for anchoring the other end of each of said cable members to said second support so that said cable members extending between said first and second supports lie under tension in a substantially centerline tensioning arrangement, and cylindrical means mounted inside each of said coil springs to prevent them from compressing beyond a given point.

4. The fence tensioning and anchoring device set forth in claim 3 in further combination with:

adjustment means connected to the other end of each of said cable members for individually varying the tension on each of said cables.

* * * * *